United States Patent
Krishnan et al.

(10) Patent No.: US 12,420,200 B2
(45) Date of Patent: Sep. 23, 2025

(54) RECONSTRUCTION OF OCCLUDED REGIONS OF A FACE USING MACHINE LEARNING

(71) Applicant: Sony Interactive Entertainment Inc., Tokyo (JP)

(72) Inventors: Rathish Krishnan, San Mateo, CA (US); Deepali Arya, San Mateo, CA (US); Manoj Srivastava, San Mateo, CA (US); Seema Kataria, San Mateo, CA (US); Jason Wang, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 351 days.

(21) Appl. No.: 18/066,255

(22) Filed: Dec. 14, 2022

(65) Prior Publication Data
US 2024/0198230 A1    Jun. 20, 2024

(51) Int. Cl.
*A63F 13/655* (2014.01)
*A63F 13/213* (2014.01)

(52) U.S. Cl.
CPC .......... *A63F 13/655* (2014.09); *A63F 13/213* (2014.09)

(58) Field of Classification Search
CPC .............................. A63F 13/655; A63F 13/213
See application file for complete search history.

(56) References Cited

U.S. PATENT DOCUMENTS

| | | | |
|---|---|---|---|
| 10,885,693 B1 * | 1/2021 | Saragih | G06T 7/97 |
| 11,238,568 B2 | 2/2022 | Grossinger et al. | |
| 11,461,962 B1 | 10/2022 | Parra Pozo et al. | |
| 11,954,762 B2 | 4/2024 | Ivanov et al. | |
| 2007/0177793 A1 | 8/2007 | Gu | |
| 2012/0327196 A1 | 12/2012 | Ohba et al. | |
| 2016/0217621 A1 | 7/2016 | Raghoebardajal et al. | |
| 2018/0101984 A1 | 4/2018 | Frueh et al. | |
| 2018/0101989 A1 | 4/2018 | Frueh et al. | |
| 2018/0158246 A1 | 6/2018 | Grau et al. | |
| 2019/0080149 A1 * | 3/2019 | Gernoth | G06V 40/166 |
| 2019/0370533 A1 | 12/2019 | Han et al. | |
| 2020/0402284 A1 * | 12/2020 | Saragih | G06V 10/757 |
| 2021/0065454 A1 | 3/2021 | Goodrich et al. | |
| 2021/0279786 A1 | 9/2021 | Oak et al. | |
| 2021/0374390 A1 | 12/2021 | Dai et al. | |
| 2022/0300791 A1 | 9/2022 | DeLaRosa et al. | |
| 2022/0413433 A1 | 12/2022 | Parra Pozo et al. | |
| 2023/0230292 A1 | 7/2023 | Ivanov et al. | |
| 2023/0252721 A1 | 8/2023 | Aleem et al. | |
| 2023/0252745 A1 | 8/2023 | Aleem et al. | |
| 2024/0177359 A1 | 5/2024 | Krishnan et al. | |
| 2024/0198230 A1 | 6/2024 | Krishnan et al. | |

FOREIGN PATENT DOCUMENTS

CN    110728628 A    1/2020

OTHER PUBLICATIONS

"International Search Report and Written Opinion", dated Mar. 4, 2024, from the counterpart PCT application PCT/US23/79446.

* cited by examiner

*Primary Examiner* — David L Lewis
*Assistant Examiner* — Shauna-Kay Hall
(74) *Attorney, Agent, or Firm* — Fish & Richardson P.C.

(57) ABSTRACT

An image of a computer game player wearing a headset that occludes part of the face is input to a trained machine learning (ML) model, which outputs in response a full-face image that is not occluded for use in, e.g., social network settings related to the game.

20 Claims, 9 Drawing Sheets

RECONSTRUCTION OF OCCLUDED REGIONS OF A FACE USING MACHINE LEARNING

FIELD

The present application relates generally to the reconstruction of occluded regions of a face such as the face of a computer gamer wearing a headset using machine learning.

BACKGROUND

As understood herein, computer simulations such as computer games may involve pitting a player against an opponent or teamed up with other players, all wearing headsets such as virtual reality (VR) or augmented reality (AR) head-mounted displays (HMDs).

SUMMARY

As further understood herein, players enjoy seeing the full faces of their teammates and opponents without being occluded by their HMDs, for better social interaction and enjoyment.

Accordingly, an apparatus includes at least one processor configured to input to at least one machine learning (ML) model an image of a computer simulation player wearing a computer simulation headset that occludes at least a portion of the face of the player. The processor is configured to receive from the ML model a full-face image of the player, and present the full-face image on a display.

The ML model may include at least one recurrent neural network (RNN) such as a long short-term memory (LSTM).

In some embodiments the processor may be configured to overlay on the full-face image an image of a partially transparent simulation headset that does not occlude a face in the full-face image. In example implementations the partially transparent simulation headset is smaller than the computer simulation headset in the duplicate image.

In some embodiments the processor can be configured to post-process the full-face image at least in part using additional information related to the player to modify the full-face image. The additional can include at least one image of the player other than the image of the player wearing the computer simulation headset, or an image of the player generated by at least one inward-facing camera of the headset, or other information.

In another aspect, a device includes at least one computer storage that is not a transitory signal and that in turn includes instructions executable by at least one processor to input to at least one machine learning (ML) model an image of a computer simulation player wearing a computer simulation headset that occludes at least a portion of the face of the player. The instructions are executable to receive from the ML model a full-face image of the player for display thereof.

In another aspect, a method includes receiving an image of a human face at least partially occluded by a computer simulation headset, inputting the image to at least one machine learning (ML) model, and receiving from the Ml model a full-face image of the player for display thereof.

The details of the present application, both as to its structure and operation, can be best understood in reference to the accompanying drawings, in which like reference numerals refer to like parts, and in which:

DETAILED DESCRIPTION

Figure 1:
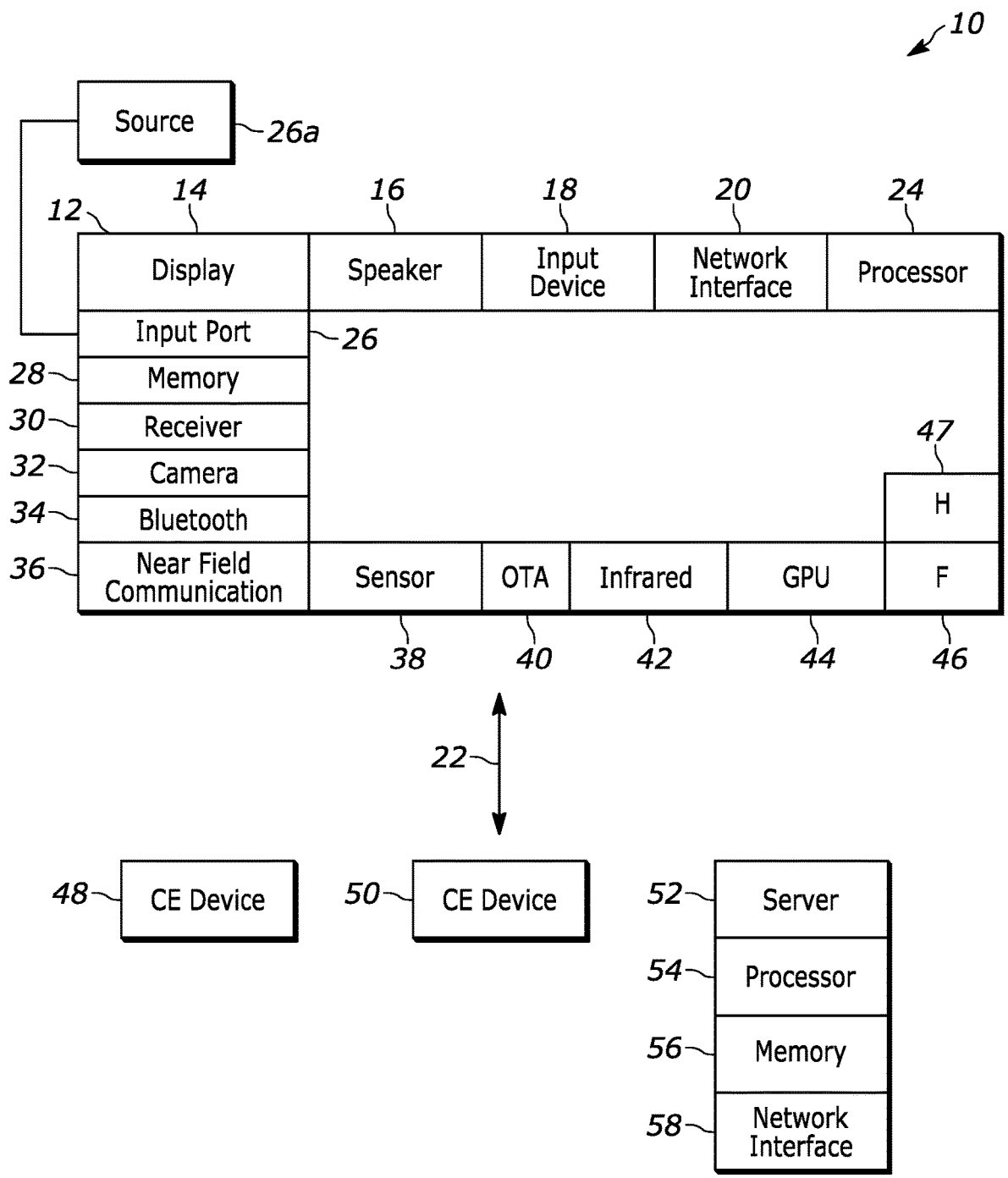
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the aforementioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
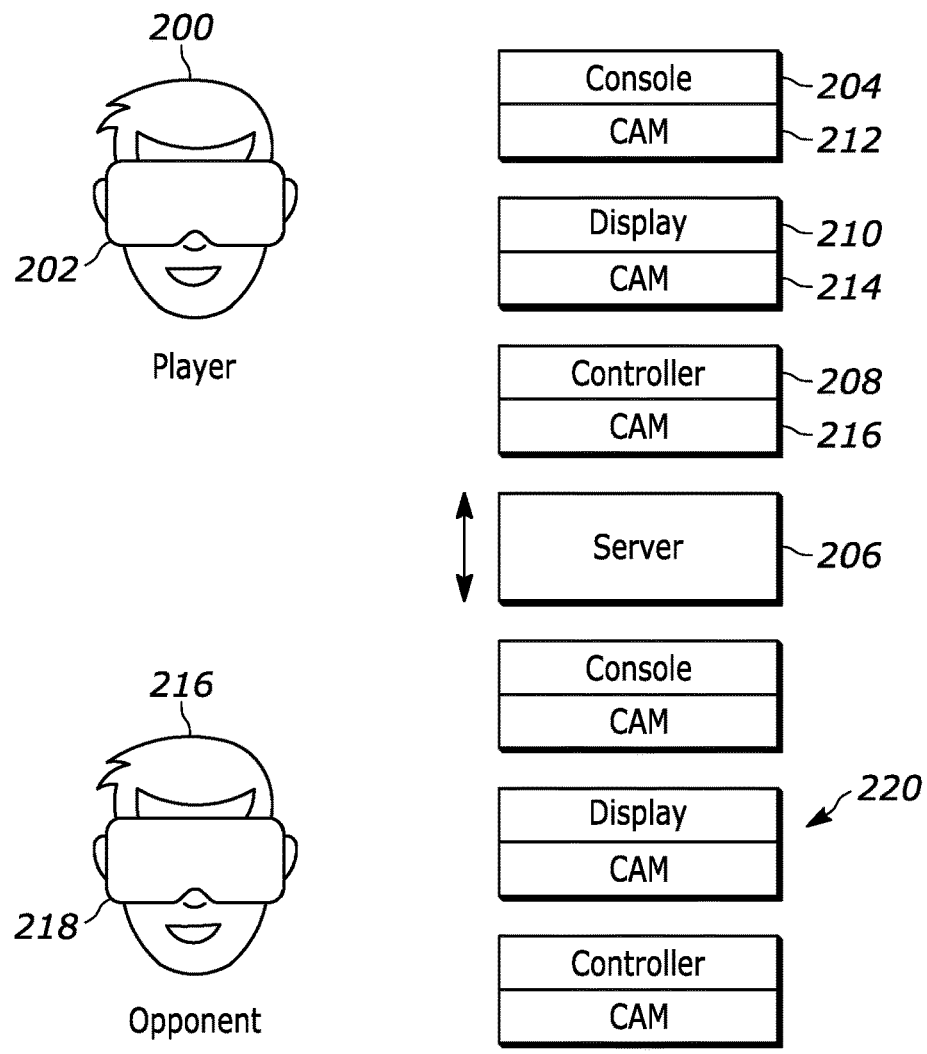
FIG. 2 illustrates an example specific system consistent with present principles.

Refer now to FIG. 2. A player 200 of a computer simulation such as a computer game can wear a headset 202 such as a virtual reality (VR) or augmented reality (AR) head-mounted display (HMD) to play a computer simulation sourced from a computer game console 204 or streamed from a server 206. The player 200 may control the simulation using a computer simulation controller 208 such as a PlayStation controller. An auxiliary display 210 such as a TV also is shown on which the simulation may be presented. Respective cameras 212, 214, 216 may be provided on the console 204, display 210, and controller 208 to image the player 200 and environs. Also, tracking cameras can be built into the outer surface of the headset in addition to the eye tracking camera.

The player 200 may play the simulation against an opponent 216 who likewise can use a headset 218 to play the simulation, with communication between the system 220 of the opponent 216, which may be similar to the player's system described above, being afforded through the server 206.

Figure 3:
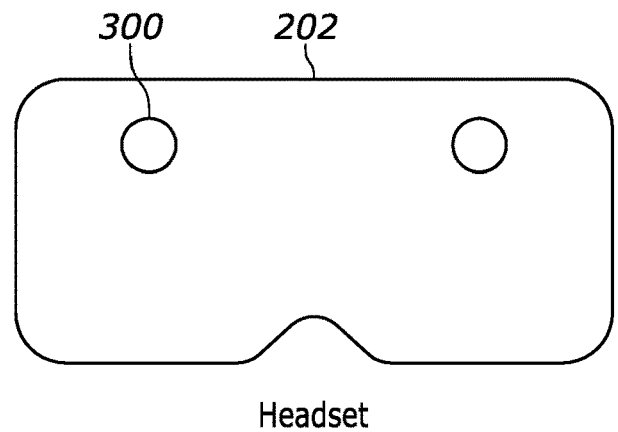
FIG. 3 illustrates an example specific headset or head-mounted device (HMD) consistent with present principles.

FIG. 3 illustrates that for, e.g., eye tracking purposes, an HMD 202 consistent with present principles may have one or more inward-facing cameras 300 to image the eyes of the wearer.

As mentioned above, present principles recognize that computer simulation players enjoy seeing the full faces of their teammates and opponents without being occluded by their HMDs. As also understood herein, full face images of the participants in a computer game may not be readily available. Instead, participants may be imaged by any of the cameras divulged herein but typically with headsets partially occluding their faces, in particular their eyes. Present principles understand that full face images of participants may not be readily available and moreover that training a machine learning (ML) model to "fill in" occluded regions of a face is rendered problematic by the relative scarcity of training image pairs consisting of full-face images along with the same faces occluded by headsets.

Figure 4:
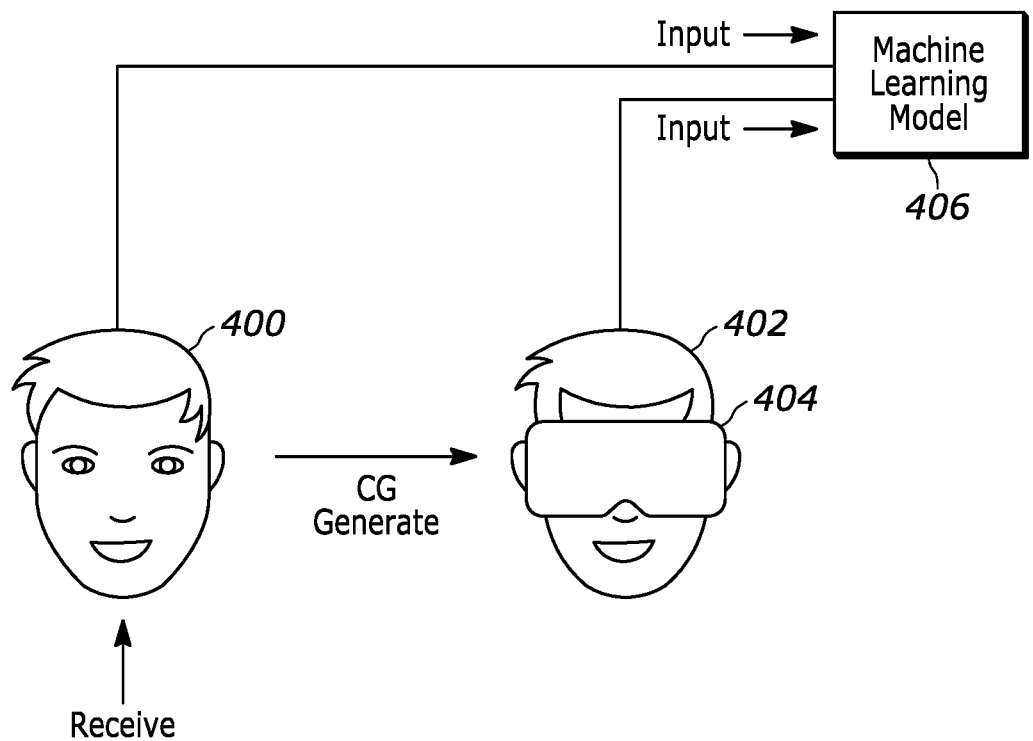
FIG. 4 schematically illustrates inputting images for training a machine learning (ML) model.

Turn now to FIG. 4 for an illustration of a solution to the above. Multiple training images 400 (only a single image shown for clarity) of full human faces without occluding objects such as headsets are received. For each of at least some and preferably all of the images, a duplicate image 402 is created. A computer graphics-generated (CG) image 404 of a headset or HMD is overlaid onto the duplicate image 402 in the same location it would be in the real world if the person whose image 400 was received were wearing the HMD. Both images 400, 402 (with overlay 404) are input as a pair to train a machine learning (ML) model 406, which may include one or more neural networks such as but not limited to recurrent neural networks (RNN) such as long short-term memories (LSTM).

Figure 5:
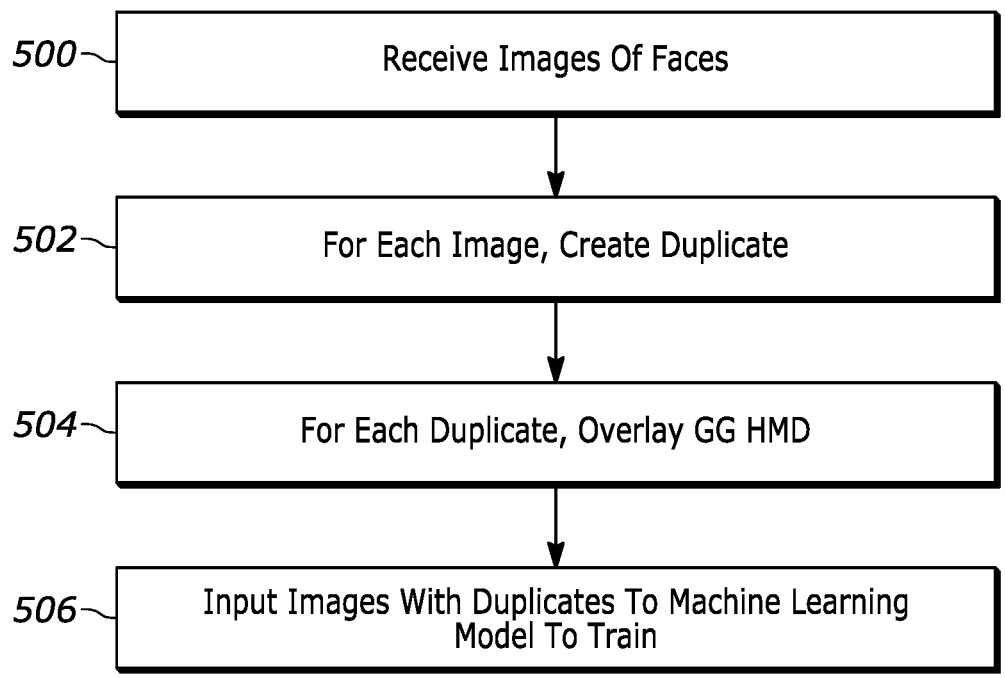
FIG. 5 illustrates example logic in example flow chart format consistent with FIG. 4.

FIG. 5 illustrates further. Commencing at block 500, plural images of human faces with no occluded regions are received. Moving to block 502, for each of at least some of the images, a duplicate of the image is generated with at least part of the face in the image occluded by a computer simulation headset at block 504 to render a respective pair of images. Proceeding to block 506, the pairs of images are input to the ML model 406 to train the model.

Figure 6:
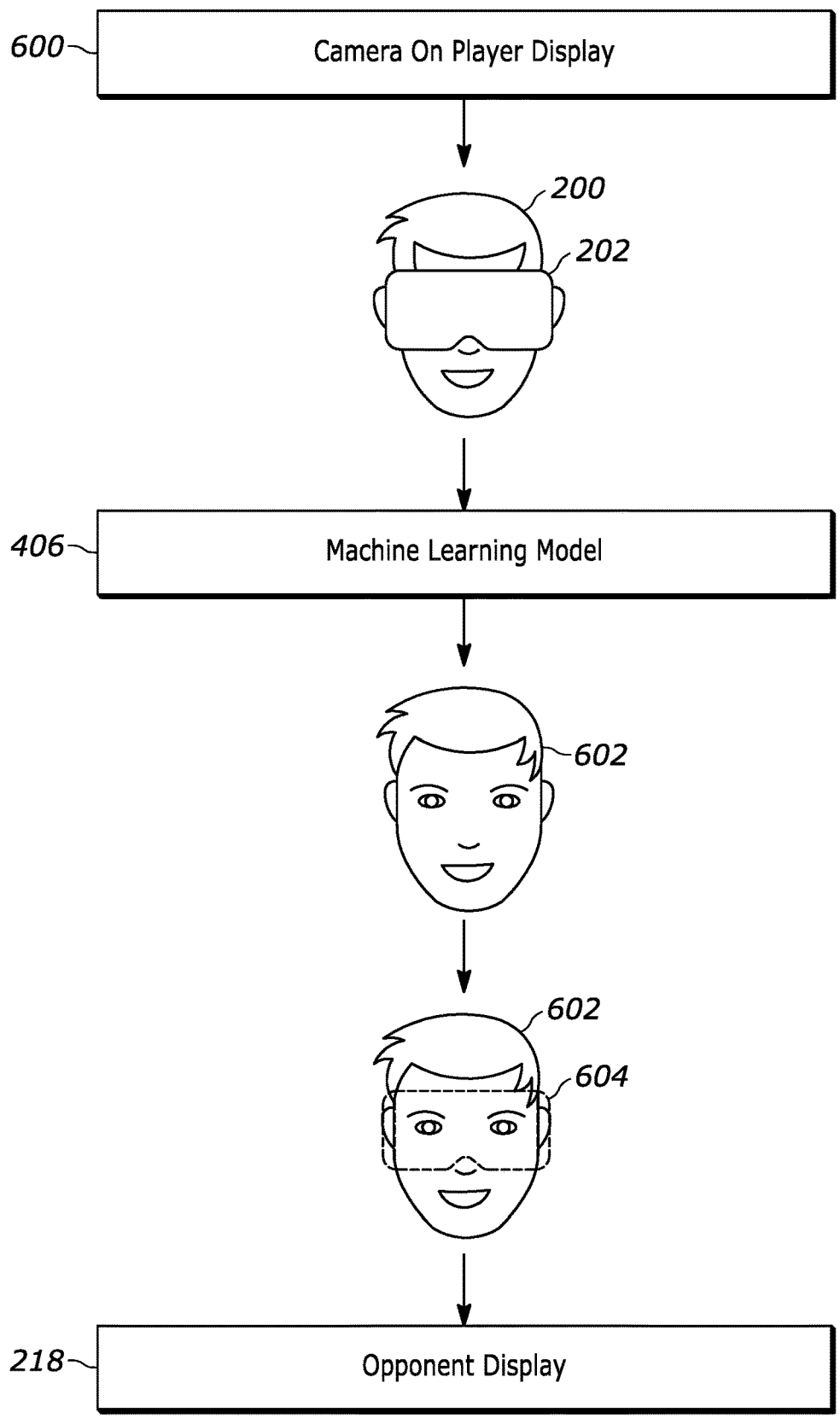
FIG. 6 schematically illustrates receiving a full-face image from a ML model trained according to present principles based on input of an image a computer simulation player wearing an HMD that partially occludes the player's face.
Figure 7:
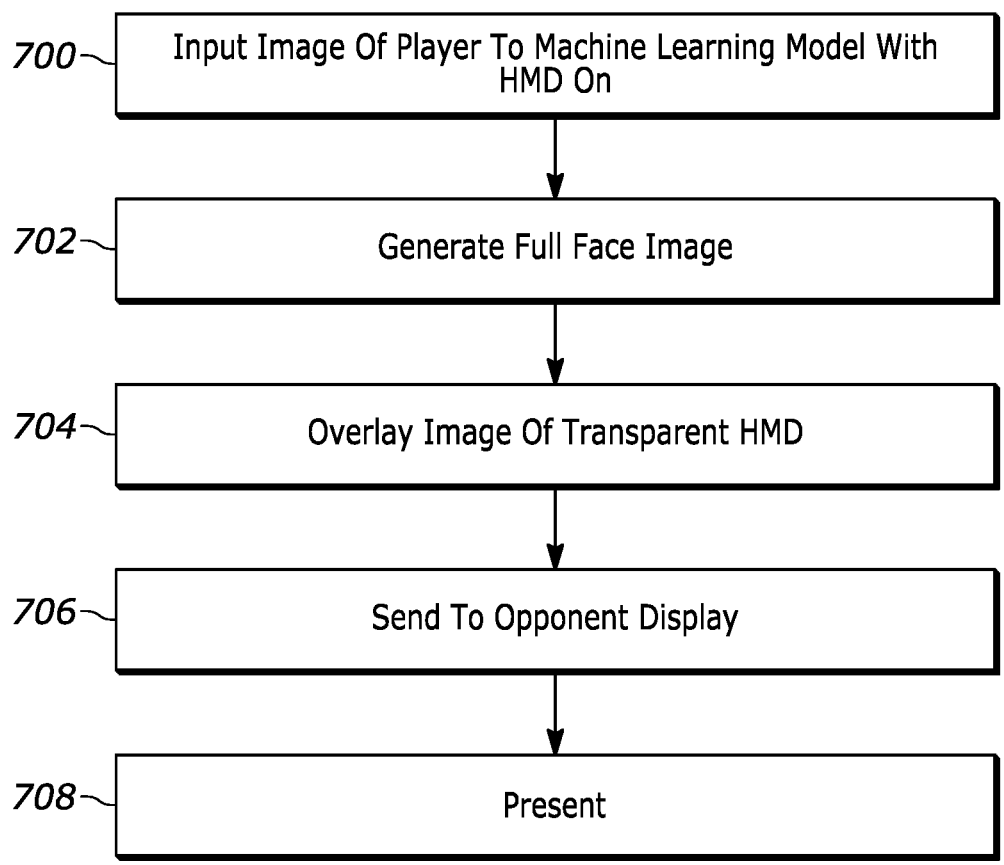
FIG. 7 illustrates example logic in example flow chart format consistent with FIG. 6.

Once the ML model 406 is trained, it may be provided to game systems for use as illustrated in FIGS. 6 and 7. In FIG. 6, any one 600 of the cameras herein may image the player 200 wearing the HMD 202. If desired, the image of the player 200 wearing the HMD 202 may be modified with respect to simulated lighting to be the same lighting as used for the training images in FIG. 5.

The image is provided to the ML model 406 which may be executed on any of the devices described herein to output a full-face image 602 of the player 200 with the occluded regions of the input image being filled in by facial features by the ML model according to its training.

If desired, the ML model 406 and/or processor executing the ML model may overlay, on the full-face image, an image 604 of a substantially transparent HMD, indicated by the dashed lines, to provide the viewer with a more realistic understanding that the imaged person is actually wearing a real-world HMD. This overlay may be done using computer-generated graphics of the HMD. However, the image 604 of the HMD does not substantially occlude the full-face image 602, as shown. The full-face image 602 may then be presented on any display herein such as the HMD 218 of the opponent 216 shown in FIG. 2. It is to be understood that a full-face image of the opponent 216 likewise may be generated as described and presented on a display of the player 200.

FIG. 7 illustrates further. Commencing at block 700, an image of the computer simulation player 200 wearing the computer simulation headset 202 that occludes at least a portion of the face of the player is input to the ML model after training as described. The ML model generates, from the input, a full-face image that is not occluded at block 702. Moving to block 702, the image 604 of the at least partially transparent simulation headset that does not occlude a face in the full-face image is overlaid on the full-face image. If the processing of blocks 700-704 is done at the player system, the image output at block 704 is sent to the opponent display for presentation at block 708, it being understood that the original image of the player 200 wearing the HMD 202 may be sent to the opponent display system to execute the processing of blocks 700-704 if desired.

Figure 8:
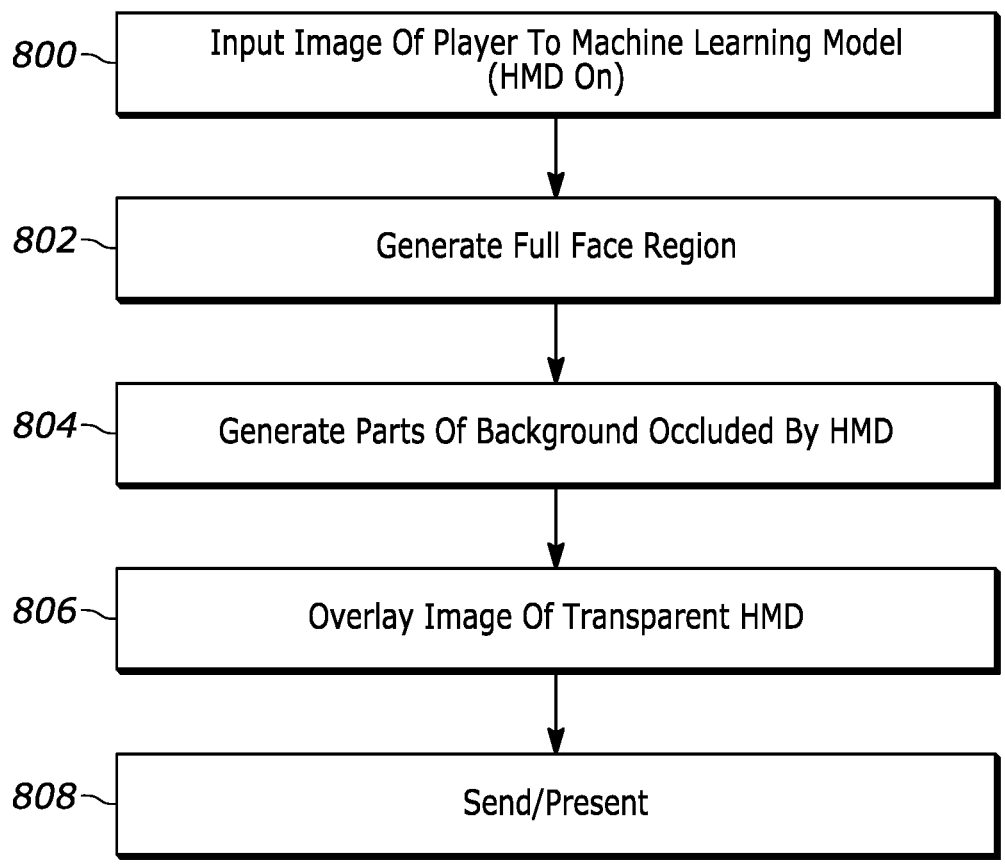
FIG. 8 illustrates example alternate logic in example flow chart format consistent with FIG. 6.

Refer now to FIG. 8 for additional features. Commencing at block 800, an image of the computer simulation player 200 wearing the computer simulation headset 202 that occludes at least a portion of the face of the player is input to the ML model after training as described. The ML model generates, from the input, a full-face image that is not occluded at block 802. Moving to block 804, parts of the background surrounding the people that were also occluded by the HMD are generated around the full-face image, it being recognized that the HMD may extend substantially beyond the contour of the face of a wearer. To generate this background that was occluded by the HMD, the ML model may be trained on various background scenes. The ML model also may use a separate photo from the user of the background.

Moving to block 806, the image 604 of the at least partially transparent simulation headset that does not occlude a face in the full-face image is overlaid on the full-face image. If the processing of blocks 800-806 is done at the player system, the image output at block 806 is sent to the opponent display for presentation at block 808, it being understood that the original image of the player 200 wearing the HMD 202 may be sent to the opponent display system to execute the processing of blocks 800-806 if desired.

Figure 9:
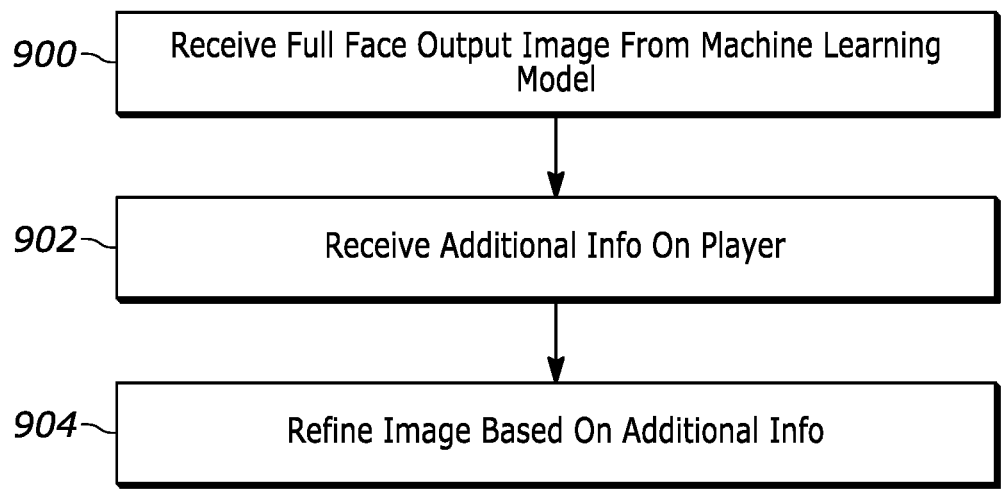
FIG. 9 illustrates example logic in example flow chart format for post-processing of the full-face image output by the ML model.

Post-processing of the full-face image output by the ML model 406 may be executed as shown in overview by FIG. 9. The full-face image output by the ML model is received at block 900. Additional information regarding the player 200 whose face is to be reconstructed is received at block 902. Based on the additional information, the full-face image may be refined at block 904.

The post-processing described herein may use facial landmarks to execute transfer learning using a model trained for the specific use case and adapted with the additional data without retraining the model from scratch. For instance, based on the additional data, weights used on the ML model may be readjusted. Higher weight may be given to training images of relatives of the player and to images of the player himself or herself.

Figure 10:
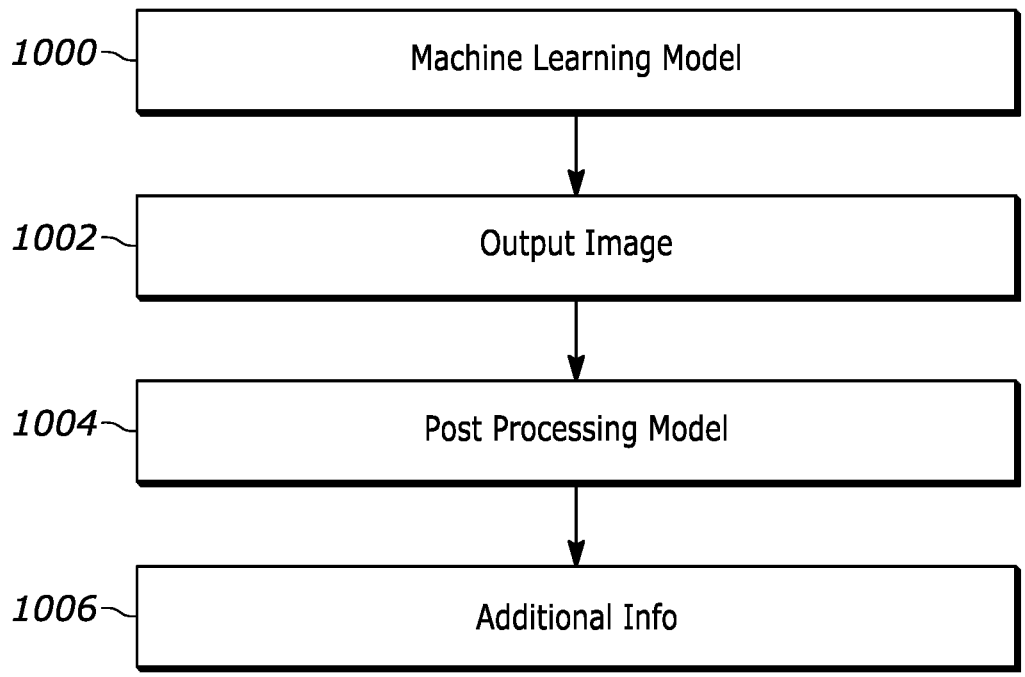
FIG. 10 illustrates an example architecture consistent with FIG. 9.

FIG. 10 illustrates further by showing a ML model 1000 such as the ML model 406 in FIG. 4 outputting a full-face image 1002, which is input to a post-processing model 1004 along with the additional information 1006 received at block 902 of FIG. 9.

Figure 11:
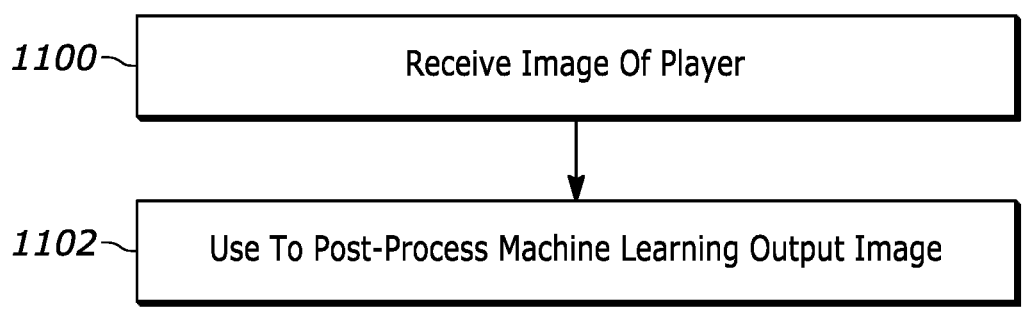
FIG. 11 illustrates example logic in example flow chart format for a first type of post-processing of the full-face image output by the ML model.

FIG. 11 illustrates a first example of post-processing. An image or video of the player 200 without a headset may be received at block 1100. A single image or video of the player may be insufficient to render a proper representation because it may be small, or blurred, or from a different angle than head on, and so on. In any case the image is used at block 1102 to refine the full image output by the ML model to better match the user image.

Figure 12:
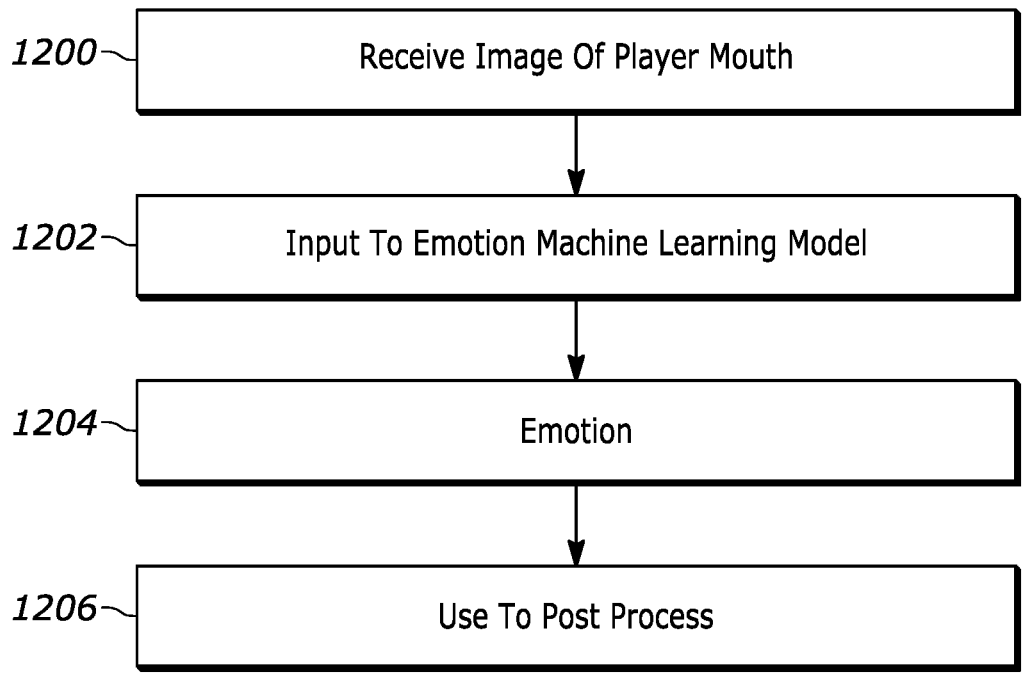
FIG. 12 illustrates example logic in example flow chart format for a second type of post-processing of the full-face image output by the ML model.

FIG. 12 illustrates a second example. An image of the player's mouth may be received at block 1200 and input at block 1202 to a ML model trained to recognize emotion and concomitant facial configurations configurations from mouth images. An emotion (or equivalently information regarding configurations of the eyes and other occluded regions of the face) is received at block 1204 and used at block 1206 to modify the full-face image output by the ML model 406 to better match the emotion.

Figure 13:
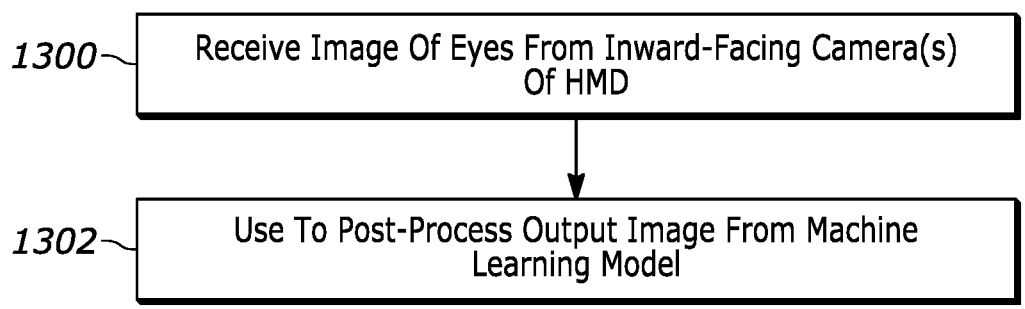
FIG. 13 illustrates example logic in example flow chart format for a third type of post-processing of the full-face image output by the ML model.

Yet again, FIG. 13 illustrates that eye spacing as imaged from the inward-facing cameras 300 in FIG. 3 may be received at block 1300 and used at block 1302 to modify the full-face image output by the ML model 406 to better match the eye spacing.

Without limitation, the post-processing model 1004 in FIG. 10 may be implemented by one or more generative adversarial networks (GAN) or other model that can, based on the additional information, rule out an output or filter by, for example, modifying a loss function to consider only a particular region of the face, such as the eyes.

Figure 14:
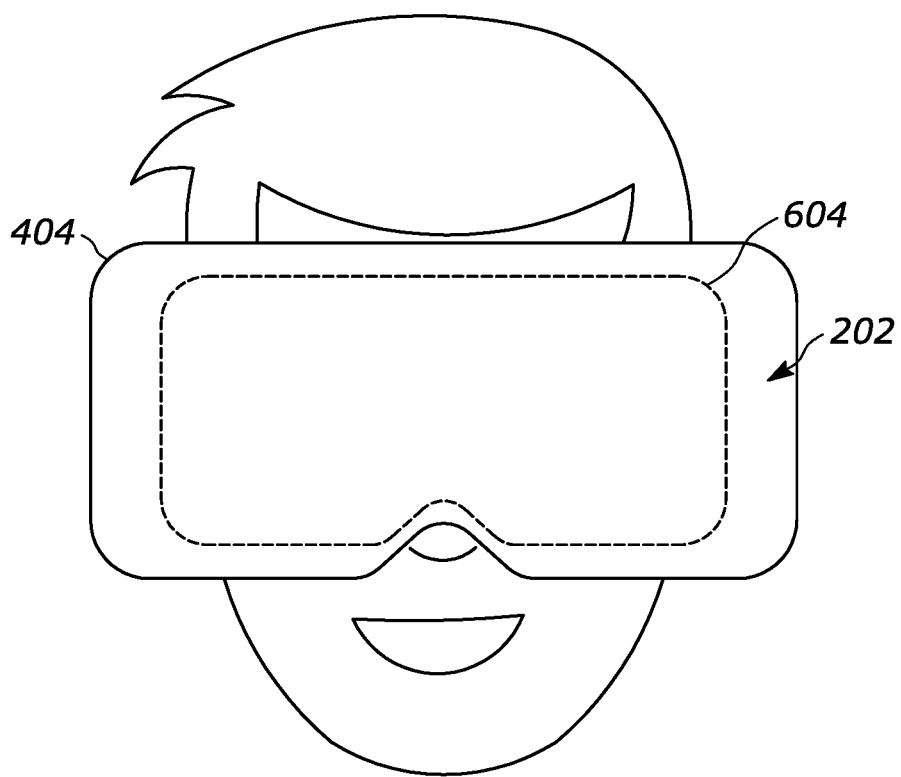
FIG. 14 schematically illustrates the size relationship between the image of the real-world HMD worn by a player and the image of the transparent computer-generated HMD overlaid onto the full-face image output by the ML model.

FIG. 14 illustrates the relationship between the size of the headset 202 in FIG. 2 (which may establish the size of the overlay image 404 in FIG. 4), and the size represented by the image 604 of a substantially transparent HMD in FIG. 6 that is output for display. Because the image 604 of a substantially transparent HMD is presented only to add realism to the player image to indicate the player is in reality wearing a HMD, it may be smaller than the size it would have if it exactly modeled the HMD 202 as shown. The area between the periphery of the image 604 of a substantially transparent HMD and the periphery of the larger HMD may be "filled in" by the ML model as described above.

Accurate datasets for training and testing can be generated for improving the face reconstruction by the ML model. Also, inclusion of extra inputs during ML training (more images of the user, emotion identifiers, etc.) can be afforded, and simulated eye blinks can be added to the reconstructed face.

While the particular embodiments are herein shown and described in detail, it is to be understood that the subject matter which is encompassed by the present invention is limited only by the claims.

What is claimed is:

1. An apparatus comprising:
    at least one processor configured to perform operations comprising:
        inputting, to at least one machine learning (ML) model, an image of a computer simulation player wearing a computer simulation headset that occludes at least a portion of the face of the player;
        receiving, as output from the ML model, a full-face image of the player;
        inputting, to a post-processing ML model, an image of a mouth of the player;
        receiving, as output from the post-processing ML model, information indicating a facial expression of the player;
        generating a modified full-face image of the player using the information indicating the facial expression of the player; and
        presenting the modified full-face image on a display.

2. The apparatus of claim 1, wherein the ML model comprises at least one recurrent neural network (RNN).

3. The apparatus of claim 1, wherein the ML model comprises at least one long short-term memory (LSTM).

4. The apparatus of claim 1, the operations comprising:
    overlaying, on the full-face image, an image of a partially transparent simulation headset that does not occlude a face in the full-face image.

5. The apparatus of claim 4, wherein the partially transparent simulation headset is smaller than the computer simulation headset in the image of the player wearing the computer simulation headset.

6. The apparatus of claim 1, the operations comprising:
    further post-processing the full-face image at least in part using additional information related to the player to further modify the full-face image.

7. The apparatus of claim 6, wherein the additional information related to the player comprises at least one image of the player other than the image of the player wearing the computer simulation headset.

8. The apparatus of claim 6, wherein the additional information related to the player comprises at least one image of the player generated by at least one inward-facing camera of the computer simulation headset.

9. A device comprising:
    at least one non-transitory computer-readable medium comprising instructions executable by at least one processor to perform operations comprising:
        inputting, to at least one machine learning (ML) model, an image of a computer simulation player wearing a computer simulation headset that occludes at least a portion of the face of the player;
        receiving, as output from the ML model, a full-face image of the player;
        inputting, to a post-processing ML model, an image of a mouth of the player;
        receiving, as output from the post-processing ML model, information indicating a facial expression of the player;
        generating a modified full-face image of the player using the information indicating the facial expression of the player; and
        presenting the modified full-face image on a display.

10. The device of claim 9, wherein the ML model comprises at least one recurrent neural network (RNN) or at least one long short-term memory (LSTM).

11. The device of claim 9, the operations comprising:
    overlaying, on the full-face image, an image of a partially transparent simulation headset that does not occlude a face in the full-face image.

12. The device of claim 11, the operations comprising:
    further post-processing the full-face image at least in part using additional information related to the player.

13. The device of claim 12, wherein the additional information related to the player comprises at least one image of the player other than the image of the player wearing the computer simulation headset.

14. The device of claim 12, wherein the additional information related to the player comprises at least one image of the player generated by at least one inward-facing camera of the computer simulation headset.

15. A method comprising:
    inputting, to at least one machine learning (ML) model, an image of a computer simulation player wearing a computer simulation headset that occludes at least a portion of the face of the player;
    receiving, as output from the ML model, a full-face image of the player;
    inputting, to a post-processing ML model, an image of a mouth of the player;
    receiving, as output from the post-processing ML model, information indicating a facial expression of the player;
    generating a modified full-face image of the player using the information indicating the facial expression of the player; and
    presenting the modified full-face image on a display.

16. The method of claim 15, comprising:
    further post-processing the full-face image at least in part using additional information related to the player to further modify the full-face image.

17. The method of claim 16, wherein the additional information related to the player comprises at least one image of the player other than the image of the player wearing the computer simulation headset.

18. The method of claim 16, wherein the additional information related to the player comprises at least one image of the player generated by at least one inward-facing camera of the computer simulation headset.

19. The apparatus of claim 1, wherein the computer simulation headset occludes a portion of a background of the player in the image of the player wearing the computer simulation headset, the operations comprising:
  inputting, to a second post-processing ML model, the full-face image of the player or the modified full-face image of the player;
  receiving, as output from the second post-processing ML model, a refined full-face image of the player including the portion of the background of the player that was occluded in the image of the player wearing the computer simulation headset; and
  presenting the refined full-face image on the display.

20. The apparatus of claim 19, wherein receiving, as output from the second post-processing ML model, the refined full-face image of the player including the portion of the background of the player that was occluded in the image of the player wearing the computer simulation headset is responsive to inputting, to the second post-processing ML model, (a) the full-face image of the player or the modified full-face image of the player and (b) at least one image of the background of the player.

\* \* \* \* \*